United States Patent
Dobler et al.

(10) Patent No.: US 6,961,702 B2
(45) Date of Patent: Nov. 1, 2005

(54) METHOD AND DEVICE FOR GENERATING AN ADAPTED REFERENCE FOR AUTOMATIC SPEECH RECOGNITION

(75) Inventors: Stefan Dobler, Neunkirchen am Brand (DE); Andreas Kiessling, Marloffstein (DE); Ralph Schleifer, Erlangen (DE); Raymond Brückner, Nürnberg (DE)

(73) Assignee: Telefonaktiebolaget LM Ericsson (publ), Stocholm (SE)

( * ) Notice: Subject to any disclaimer, the term of this patent is extended or adjusted under 35 U.S.C. 154(b) by 646 days.

(21) Appl. No.: 09/985,844

(22) Filed: Nov. 6, 2001

(65) Prior Publication Data

US 2002/0069053 A1 Jun. 6, 2002

(30) Foreign Application Priority Data

Nov. 7, 2000 (EP) .............................................. 00123488

(51) Int. Cl.⁷ .......................... G10L 15/06; G10L 15/10; G10L 15/12
(52) U.S. Cl. ...................... 704/244; 704/238; 704/241; 704/245
(58) Field of Search ............................... 704/244, 238, 704/241, 245

(56) References Cited

U.S. PATENT DOCUMENTS

| | | | | |
|---|---|---|---|---|
| 4,060,694 A | * | 11/1977 | Suzuki et al. | 704/252 |
| 4,720,863 A | * | 1/1988 | Li et al. | 704/247 |
| 5,127,055 A | * | 6/1992 | Larkey | 704/244 |
| 5,274,737 A | * | 12/1993 | Shinoda | 704/245 |
| 5,617,486 A | | 4/1997 | Chow et al. | |
| 5,842,161 A | | 11/1998 | Cohrs et al. | |
| 5,895,447 A | * | 4/1999 | Ittycheriah et al. | 704/231 |
| 6,012,027 A | | 1/2000 | Bossemeyer, Jr. | |
| 6,253,181 B1 | * | 6/2001 | Junqua | 704/255 |
| 6,260,013 B1 | * | 7/2001 | Sejnoha | 704/240 |
| 6,732,074 B1 | * | 5/2004 | Kuroda | 704/244 |
| 6,799,162 B1 | * | 9/2004 | Goronzy et al. | 704/244 |

FOREIGN PATENT DOCUMENTS

| | | |
|---|---|---|
| EP | 0762383 A | 3/1997 |
| EP | 1022722 A2 | 7/2000 |
| EP | 1022724 A | 7/2000 |

OTHER PUBLICATIONS

Homma, S. et al.: "Iterative Unsupervised Speaker Adaptation for Batch Dictation", NTT Human Interface Laboratories, Kanagawa, Japan, ICSLP 1996.

* cited by examiner

Primary Examiner—David L. Ometz
Assistant Examiner—Brian Albertalli

(57) ABSTRACT

The invention relates to a method for generating an adapted reference for automatic speech recognition. In a first step, recognition is performed based on a spoken utterance and a recognition result which corresponds to a currently valid reference is obtained. In a second step, the currently valid reference is adapted in accordance with the utterance in order to create an adapted reference. In a third step, the adapted reference is assessed and it is decided if the adapted reference is used for further recognition.

15 Claims, 3 Drawing Sheets

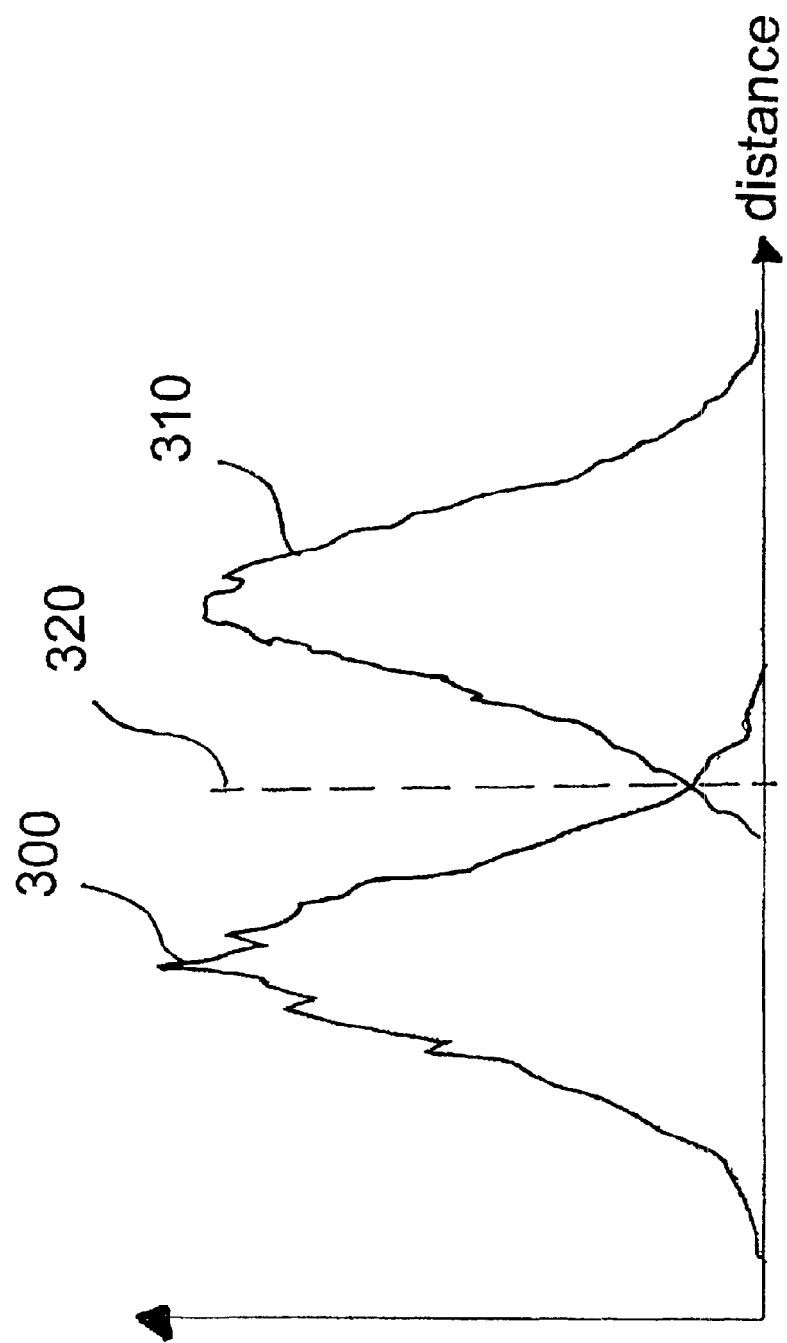

METHOD AND DEVICE FOR GENERATING AN ADAPTED REFERENCE FOR AUTOMATIC SPEECH RECOGNITION

BACKGROUND OF THE INVENTION

1. Technical Field

The invention relates to the field of automatic speech recognition and more particularly to generating a reference adapted to an individual speaker.

2. Discussion of the Prior Art

During automatic speech recognition a spoken utterance is analyzed and compared with one or more already existing references. If the spoken utterance matches an existing reference, a corresponding recognition result is output. The recognition result can e.g. be a pointer which identifies the existing reference which is matched by the spoken utterance.

The references used for automatic speech recognition can be both speaker dependent and speaker independent. Speaker independent references can e.g. be created by averaging utterances of a large number of different speakers in a training process. Speaker dependent references for an individual speaker, i.e., references which are personalized in accordance with an individual speaker's speaking habit, can be obtained by means of an individual training process. In order to keep the effort for the training of speaker dependent references low, it is preferable to use a single word spoken in isolation for each speaker dependent reference to be trained. The fact that the training utterances are spoken in isolation leads to problems for connected word recognition because fluently spoken utterances differ from utterances spoken in isolation due to coarticulation effects. These coarticulation effects deteriorate the accuracy of automatic speech recognition if speaker dependent references which were trained in isolation are used for recognition of connected words. Moreover, even if connected words have been trained, a user's voice may change, e.g. due to different health conditions, which also deteriorates the accuracy of automatic speech recognition which is based on speaker dependent references. The accuracy of automatic speech recognition is generally even lower if speaker independent references are used, especially when the utterances are spoken in a heavy dialect or with a foreign accent. The accuracy of automatic speech recognition is also influenced by the speaker's acoustic environment, e.g. the presence of background noise or the use of a so-called hands free set.

In order to improve the recognition results of automatic speech recognition, speaker adaptation is used. Speaker adaptation allows to incorporate individual speaker characteristics in both speaker dependent and speaker independent references. A method and a device for continuously updating existing references is known from WO 95/09416. The method and the device described in WO 95/09416 allow to adapt existing references to changes in a speaker's voice and to changing background noise. An adaptation of an existing reference in accordance with a spoken utterance takes place each time a recognition result which corresponds to an existing reference is obtained, i.e., each time a spoken utterance is recognized.

It has been found that speaker adaptation of existing references generally improves the accuracy of automatic speech recognition. However, the accuracy of automatic speech recognition using continuously adapted references generally shows fluctuations. This means that the recognition accuracy does not continuously improve with each adaptation process. To the contrary, the recognition accuracy may also temporarily decrease.

There is, therefore, a need for a method and a device for generating an adapted reference for automatic speech recognition which is less prone to a deterioration of the recognition accuracy.

SUMMARY OF THE INVENTION

The present invention satisfies this need by providing a method for generating a reference adapted to an individual speaker or a speaker's acoustic environment which comprises performing automatic speech recognition based on a spoken utterance and obtaining a recognition result which corresponds to a currently valid reference, adapting the currently valid reference in accordance with the utterance, assessing the adapted reference and deciding if the adapted reference is used for further is recognition. A device for generating a speaker adapted reference which satisfies this need comprises a speech recognizer for performing recognition based on a spoken utterance and for obtaining a recognition result which corresponds to a currently valid reference, an adaption unit which adapts the currently valid reference in accordance with the utterance and an assessing unit which assesses the adapted reference and decides if the adapted reference is used for further recognition.

According to the invention, an assessment step is conducted after the currently valid speaker dependent or speaker independent reference is adapted. Then, and based on the result of the assessment, it is decided whether or not the adapted reference is used for further recognition. It can thus be avoided that a reference which is adapted in the wrong direction will be used for further recognition. A deterioration of the recognition accuracy would take place e.g. if the recognition result does not match the spoken utterance and the adaptation process is carried out without an assessment step. Consequently, according to the invention, corrupted adapted references can be rejected and e.g. permanent storing of corrupted adapted references can be aborted. This is preferably done prior to recognizing the next spoken utterance.

According to a first aspect of the invention, the adapted reference is assessed by determining a distance between the adapted reference and the currently valid reference. The determined distance can then be used as input for the decision if the adapted reference is used for further recognition. Moreover, when assessing the adapted reference, the distances between the adapted reference and all other currently valid references which do not correspond to the recognition result may additionally be taken into account. This enables to base the decision if the adapted reference is used for further recognition on the question which of all currently valid references is closest to the adapted reference. Thus, if one of the currently valid references which does not correspond to the recognition result has a smaller distance from the adapted reference than the currently valid reference which corresponds to the recognition result, the adapted reference can be discarded.

According to a second aspect of the invention, the assessment of the adapted reference is based on an evaluation of the user behaviour. The recognition result will most likely be wrong if e.g. a specific action automatically initiated upon obtaining the recognition result is immediately cancelled by the user or if the user refuses to confirm the recognition result. In this case it can automatically be decided that the adapted reference is to be discarded and not to be used for further automatic speech recognition. An evaluation of the user behaviour can also be carried out prior to adapting a currently valid reference in accordance with a user utterance.

The adaptation process is thus not initiated if the user behaviour indicates that the recognition result is wrong. In other words, the adaptation only takes place if the user behaviour indicates that the recognition result is correct.

According to a third aspect of the invention, the adapted reference is assessed both by evaluating the user behaviour and by determining a distance between the adapted reference and one or more currently valid references.

The decision if the adapted reference is to be used for further recognition may be a "hard" decision or a "soft" decision. The "hard" decision may be based on the question whether or not a certain threshold of a specific parameter obtained by assessing the adapted reference has been exceeded. On the other hand, a "soft" decision may be made by means of e.g. a neuronal network which takes into account a plurality of parameters like a specific user behaviour and a distance between an adapted reference and one or more currently valid references.

In case the decision is based on the distances between the adapted reference and one or more existing references, the parameters relevant for assessing an adapted reference are preferably obtained by analyzing a histogram of previously determined distances. The distances between the adapted reference and one or more existing references are preferably calculated with dynamic programming.

If it is decided that the adapted reference is used for further recognition, the adapted reference can be stored. In regard to storing the adapted reference several strategies can be applied. According to the most simple embodiment, an adapted reference is simply substituted for the corresponding previously valid reference. According to a further embodiment, a set of adapted references is created which is used in addition to a set of currently valid references. Thus, the currently valid references constitute a fallback position in case the adapted references are e.g. developed in a wrong direction. A further fallback position can be created by additionally and permanently storing a set of so-called mother references which constitute a set of initially created references.

Preferably, a currently valid reference is not adapted automatically after a recognition result is obtained but only after confirmation of the recognition result. The nature of the confirmation depends on the purpose of the automatic speech recognition. If the automatic speech recognition is e.g. employed for addressing an entry in a telephonebook of a mobile telephone, the confirmation can be a setting up of a call based on the recognized entry.

The device for generating an adapted reference according to the invention can comprise at least two separate storing means for storing two separate sets of references. The provision of a plurality of storing means allows to delay the decision whether or not to store an adapted reference permanently. For each utterance recognizable by the means for performing the recognition a pair of references can be stored such that a first of the two references is stored in the first storing means and a second of the two references in the second storing means. Also, third storing means can be provided for storing mother references.

In connection with the plurality of storing means a selection unit can be employed which set pointers that allow to determine all references currently valid for recognition of spoken utterances. According to a first aspect, a pointer is set to this reference of each pair of references which is currently valid, i.e. which constitutes a reference to be used for automatic speech recognition. Upon generating a newly adapted reference, the reference of a pair of references to which the pointer is not set may be then overwritten by the newly adapted reference. According to a second embodiment, a pointer is set to the first storing means containing a currently valid set of references. Prior to or after an adapted reference is created, the content of the first storing means is copied in the second storing means. Then, the adapted reference is stored in the second storing means such that a corresponding reference in the second storing means is overwritten by the adapted reference. If, after an assessment step, it is decided to use the adapted reference for further recognition, the pointer is shifted from the first storing means to the second storing means. Otherwise, if it is decided to discard the adapted reference, the pointer is not shifted.

A further aspect of the invention relates to a computer program product with program code means for performing the generation of an adapted reference for automatic speech recognition when the computer program product is executed in a computing unit. Preferably, the computer program product is stored on a computer-readable recording medium.

BRIEF DESCRIPTION OF THE DRAWINGS

Further aspects and advantages of the invention will become apparent upon reading the following detailed description of a preferred embodiment of the invention and upon reference to the drawings in which:

FIG. 3 shows histograms of distances between references for correct and erroneous recognition results.

DESCRIPTION OF A PREFERRED EMBODIMENT

Figure 1:
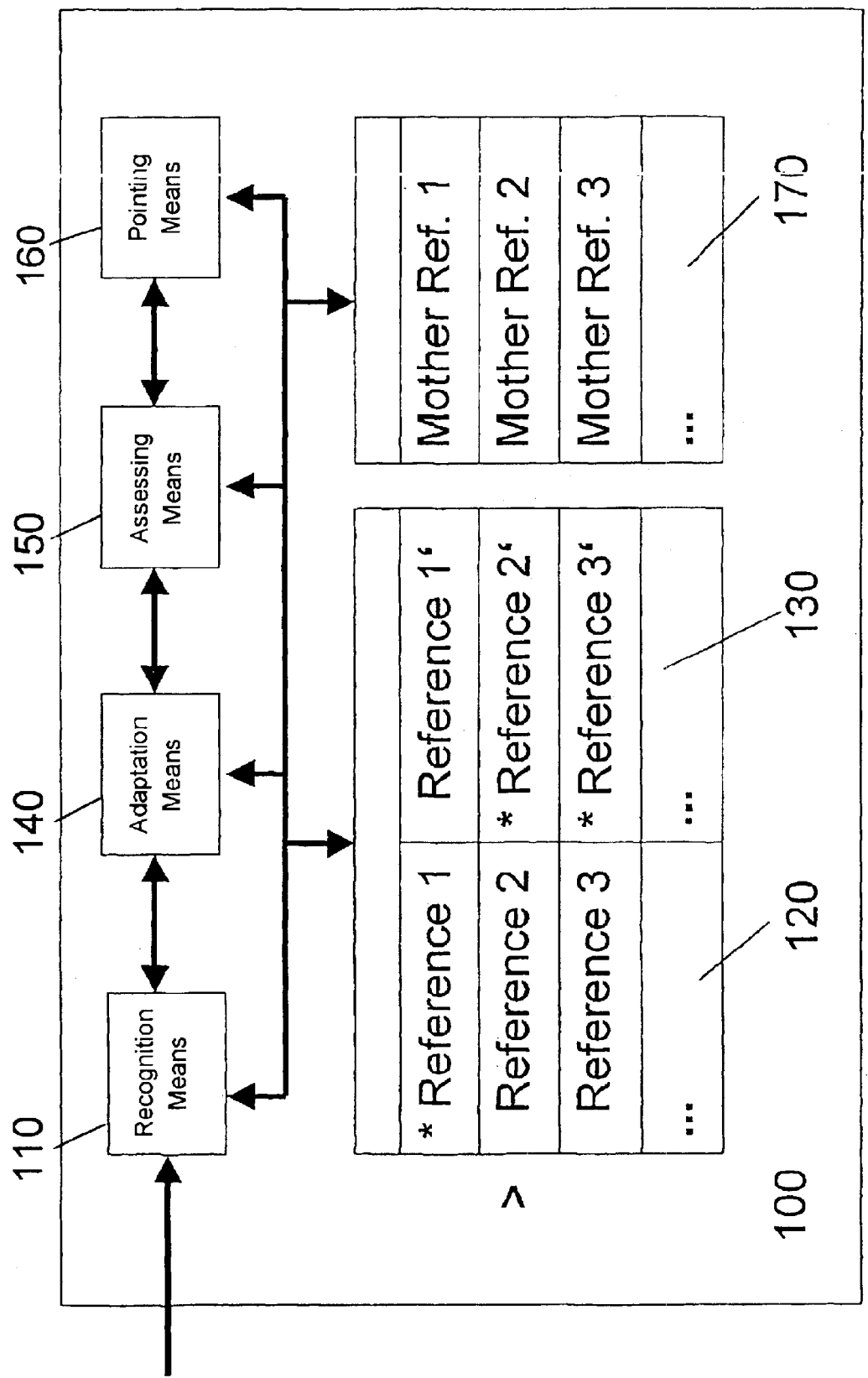
FIG. 1 is a schematic diagram of a device for generating a speaker adapted reference according to the invention.

In FIG. 1, a schematic diagram of an embodiment of a device 100 according to the invention for generating a speaker adapted reference for automatic speech recognition is illustrated. The device 100 depicted in FIG. 1 can e.g. be a mobile telephone with a voice interface allowing to address a telephone book entry by uttering a person's proper name.

The device 100 comprises recognition means 110 in the form of a speech recognizer for performing recognition based on a spoken utterance and for obtaining a recognition result which corresponds to an already existing and currently valid reference.

The recognition means 110 communicate with first 120 and second 130 storing means and with adaptation means 140 for adapting an existing reference in accordance with the spoken utterance. The first 120 and second 130 storing means constitute the vocabulary of the recognition means 110. A pair of references is stored for each item of the vocabulary such that a first reference of each pair of reference is stored in the first storing means 120 and a second reference of each pair of references is stored in the second storing means 130. However, only one of the two reference, which constitute a pair of references is defined as currently valid and can be used by the recognition means 110. A first pointer (*) is set to the currently valid reference of each pair of references.

The adaptation means 140 communicate with the first 120 and second 130 storing means as well as with assessing means 150. The assessing means 150 assess the adapted reference and decide if the adapted reference is used for further recognition. The assessing means 150 communicate with pointing means 160 in the form of a selection unit which communicate with the first 120 and second 130 storing means.

The device 100 depicted in FIG. 1 further comprises third storing means 170 for storing a mother reference for each item of the vocabulary of the recognition-means 110. The mother references stored in the third storing means 170 are initially created speaker dependent or speaker independent references. The mother references can be used both in parallel to the references stored in the first 120 and the second 130 storing means or as a fallback position.

Figure 2:
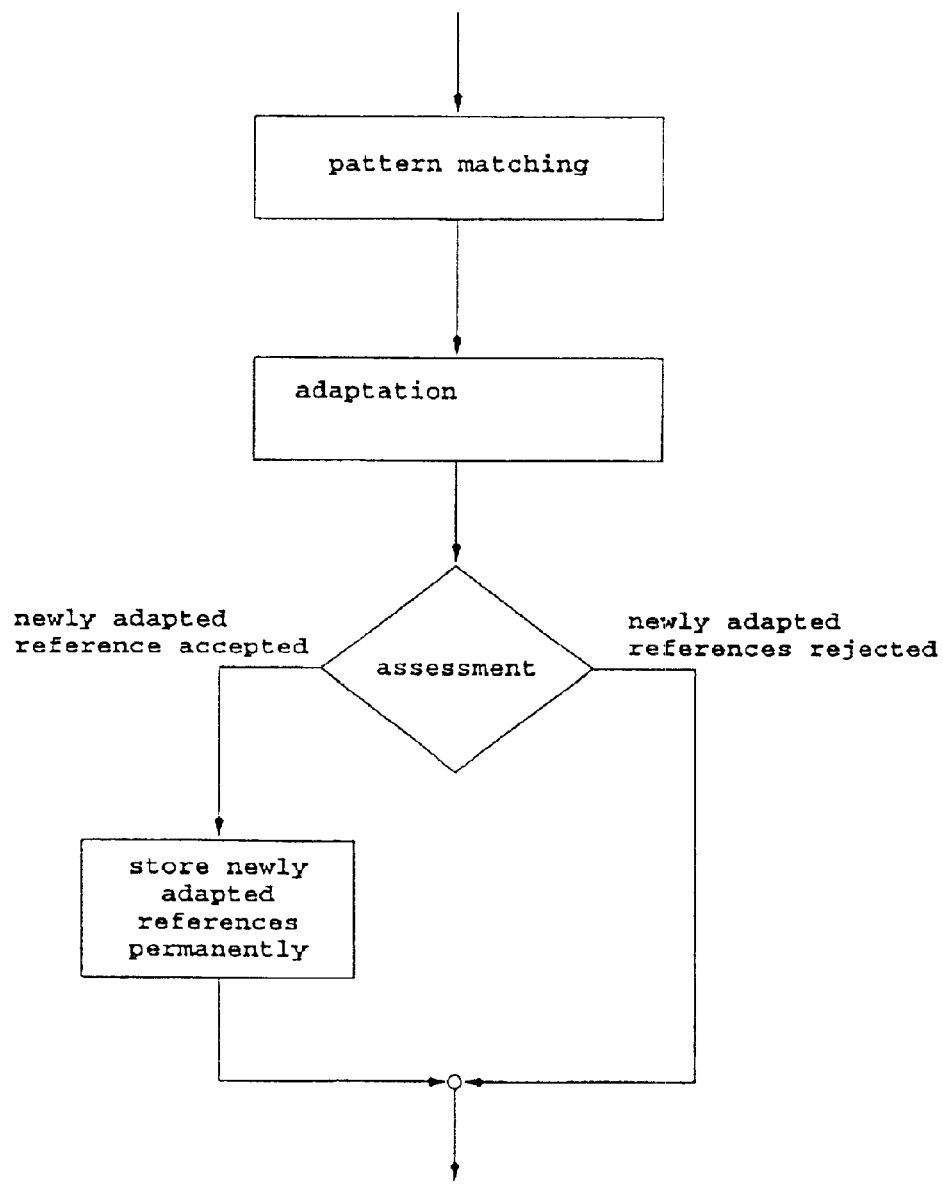
FIG. 2 is a flow chart depicting a method for generating a speaker adapted reference according to the invention.

Referring now to the flow chart of FIG. 2, the function of the device 100 is described in more detail.

Upon receipt of a signal corresponding to a spoken utterance, the recognition means 110 perform a recognition process. The signal can be provided e.g. from a microphone or a different signal source. The recognition process comprises matching a pattern like one or more feature vectors of the spoken utterance with corresponding patterns of all currently valid references stored in either the first 120 or the second 130 storing means, i.e., all references to which the first pointers (*) are set. The first pointers (*) were set by the pointing means 160 as will be described below in more detail. If the pattern of the spoken utterance matches a pattern of a currently valid reference, a recognition result which corresponds to the matching reference is obtained by the recognition means 110. The recognition result is formed by a second pointer (>) which points to the pair of references which contains the currently valid reference matched by the spoken utterance.

After the recognition result is obtained, the telephone book entry, e.g. a person's proper name, which corresponds to the recognition result may be acoustically or optically output via an output unit not depicted in FIG. 1 to a user for confirmation. After the user confirms that the output is correct, e.g. by setting up the call to the person corresponding to the telephone book entry, the recognition result is output to the adaptation means 140.

The adaptation means 140 load the valid reference of the pair of references to which the second pointer (>) is set. The adaptation means 140 then adapt the loaded reference in accordance with the spoken utterance. This can e.g. be done by shifting the feature vectors of the loaded reference slightly towards the feature vectors of the spoken utterance. Thus, an adapted reference is generated based on both the loaded reference and the spoken utterance. After the adapted reference has been generated, the adaptation means 140 store the adapted reference by overwriting the non-valid reference of the pair of references to which the second pointer (>) is set.

After the adapted reference has been stored, the assessing means 150 assess the adapted reference as will be described below. The assessing is necessary since the user confirmation might have been wrong. If the user has e.g. erroneously confirmed a wrong recognition result, the adapted reference would be corrupted. The adapted reference has therefore to be assessed. Based on the result of the assessment, the assessing means 150 decide if the adapted reference is used for further recognition.

If it is decided to use the adapted reference for further recognition, the first pointer (*) is shifted within the current pair of references to the adapted reference by the pointing means 160. Consequently, the newly adapted reference to which the first pointer (*) has been set will constitute the valid reference in terms of recognizing a subsequent spoken utterance. The adapted reference is thus stored permanently. On the other hand, if it is decided to reject the adapted reference, the position of the first pointer (*) is not changed within the pair of references to which the second pointer (>) is set. Consequently, the adapted reference may be overwritten in a subsequent recognition step.

In the following, the function of the assessing means 150 is described by means of two exemplary embodiments.

According to a first embodiment, the assessing means 150 determine the distance between the newly adapted reference and the currently valid reference of the pair of references to which the second pointer (>) is set. The distance is calculated by means of dynamic programming (dynamic time warping) as described in detail in "The Use of the One-Stage Dynamic Programming Algorithm for Connected Word Recognition", IEEE Transaction Acoustics, Speech and Signal Processing, Volume ASSP-32, No. 2, pp. 263 to 271, 1984, herewith incorporated by reference.

After the distance has been calculated, the assessing means 150 decide whether or not to use the adapted reference for further recognition, i.e., whether or not to shift the corresponding first pointer (*), based on a distance threshold. This means that the adapted reference is only used for further recognition if the distance between the adapted reference and the corresponding currently valid reference does not exceed this threshold.

The distance threshold can be obtained by analyzing a histogram of previously determined distances corresponding to real life data as depicted in FIG. 3. FIG. 3 shows two different histograms 300, 310. The first histogram 300 reflects the distances between adapted references and existing references for correct recognition results and the other histogram 310 for erroneous recognition results. From FIG. 3 it becomes clear that the average distance for correct recognition results is smaller than the average distance for erroneous recognition results. In order to create the histograms depicted in FIG. 3, a large amount of data has to be analyzed.

The above mentioned distance threshold for deciding whether an adapted reference is used for further recognition is chosen e.g. at the crossing or in the vicinity of the crossing of the two histograms 300, 310 (as indicated by the line 320). Consequently, an adapted reference is used for further recognition if the calculated distance does not exceed the distance corresponding to the line 320.

If only the distance between the adapted reference and the corresponding currently valid reference of the pair of references to which the second pointer (>) is set is determined, only the shifting between these two references is taken into account. According to a second, exemplary embodiment for assessing the adapted reference, the distance between the adapted reference and all other currently valid references to which first pointers (*) are set are additionally calculated. Consequently, the shifting of the adapted reference with respect to all currently valid references constituting the vocabulary of the recognition means 110 is taken into account. The distances can again be calculated by means of dynamic programming.

After the distances between the adapted reference and all other currently valid references have been calculated, the currently valid reference having the smallest distance from the adapted reference is determined. Should the currently valid reference having the smallest distance from the adapted reference not correspond to the pair of references to which the second pointer (>) is set, it is decided that the adapted reference is not used for further recognition.

Otherwise, should the currently valid reference with the smallest distance from the adapted reference belong to the pair of references to which the second pointer (>) is set, the adapted reference is used or further recognition.

It will be appreciated by those of ordinary skills in the art that this invention can be embodied in other specific forms without departing from its essential character. The embodiments described above should therefore be considered in all respects to be illustrative and not restrictive. The scope of the invention is determined solely by the following claims, and all modifications that fall within that scope are intended to be included therein.

What is claimed is:

1. A method for generating adapted references for automatic speech recognition, comprising:
   receiving a spoken utterance and matching a pattern of the spoken utterance with corresponding patterns of a plurality of currently valid references to obtain the currently valid reference which corresponds to the spoken utterance;
   adapting the pattern of the currently valid reference corresponding to the spoken utterance by shifting the pattern of the currently valid reference towards the pattern of the spoken utterance to generate an adapted reference;
   assessing the adapted reference by determining the distance between the adapted reference and at least one of the currently valid references; and
   deciding on the basis of the one or more distances if the adapted reference is to be used for recognizing a subsequent spoken utterance.

2. The method of claim 1, wherein the adapted reference is assessed also based on a user behavior.

3. The method of claim 1, wherein the adapted reference is assessed by further determining distances between the adapted reference and currently valid references which do not correspond to the recognition result.

4. The method of claim 1, further comprising analyzing a histogram of previously determined distances in order to obtain one or more parameters for deciding if the adapted reference is used for further recognition.

5. The method of claim 1, wherein the distance is determined by dynamic programming.

6. The method of claim 1, further comprising substituting the currently valid reference by the adapted reference.

7. The method of claim 1, further comprising storing the adapted reference in addition to the currently valid reference.

8. The method claim 1, wherein the adapted reference is created only when a user behavior indicates that the recognition result is correct.

9. A computer program product embodied on a computer readable medium with program code means for automatic speech recognition performing the steps of:
   receiving a spoken utterance and matching a pattern of the spoken utterance with corresponding patterns of a plurality of currently valid references to obtain the currently valid reference which corresponds to the spoken utterance;
   adapting the pattern of the currently valid reference corresponding to the spoken utterance by shifting the pattern of the currently valid reference towards the pattern of the spoken utterance to generate an adapted reference;
   assessing the adapted reference by determining the distance between the adapted reference and at least one of the currently valid references; and
   deciding on the basis of the one or more distances if the adapted reference is to be used for recognizing a subsequent spoken utterance.

10. The computer program product with program code means according to claim 9 stored on a computer-readable recording medium.

11. A device for generating adapted references for automatic speech recognition, comprising:
    a speech recognizer which matches a pattern of a spoken utterance with patterns of a plurality of currently valid references to identity a currently valid reference which corresponds to the spoken utterance;
    an adaption unit which shifts the pattern of the currently valid reference which correspond to the spoken utterance towards the pattern of the spoken utterance to generate an adapted reference; and
    an assessing unit which assesses the adapted reference by determining the distance between the adapted reference and at least one of the currently valid references, and
    a means for deciding if the adapted reference is to be used by the speech recognizer for recognizing a subsequent spoken utterance.

12. The device of claim 11, further comprising a first memory and a second memory for storing a first and a second set of references, respectively.

13. The device of claim 11, further comprising a selection unit which sets a pointer to either the first or the second memory depending on whether the first or the second set of references are to be used for recognition.

14. The device of claim 11, further comprising a third memory for storing a set of mother references.

15. The device of claim 11, further comprising a selection unit for setting pointers which allow to determine all references currently valid for recognition of spoken utterances.

* * * * *